Figure 1:
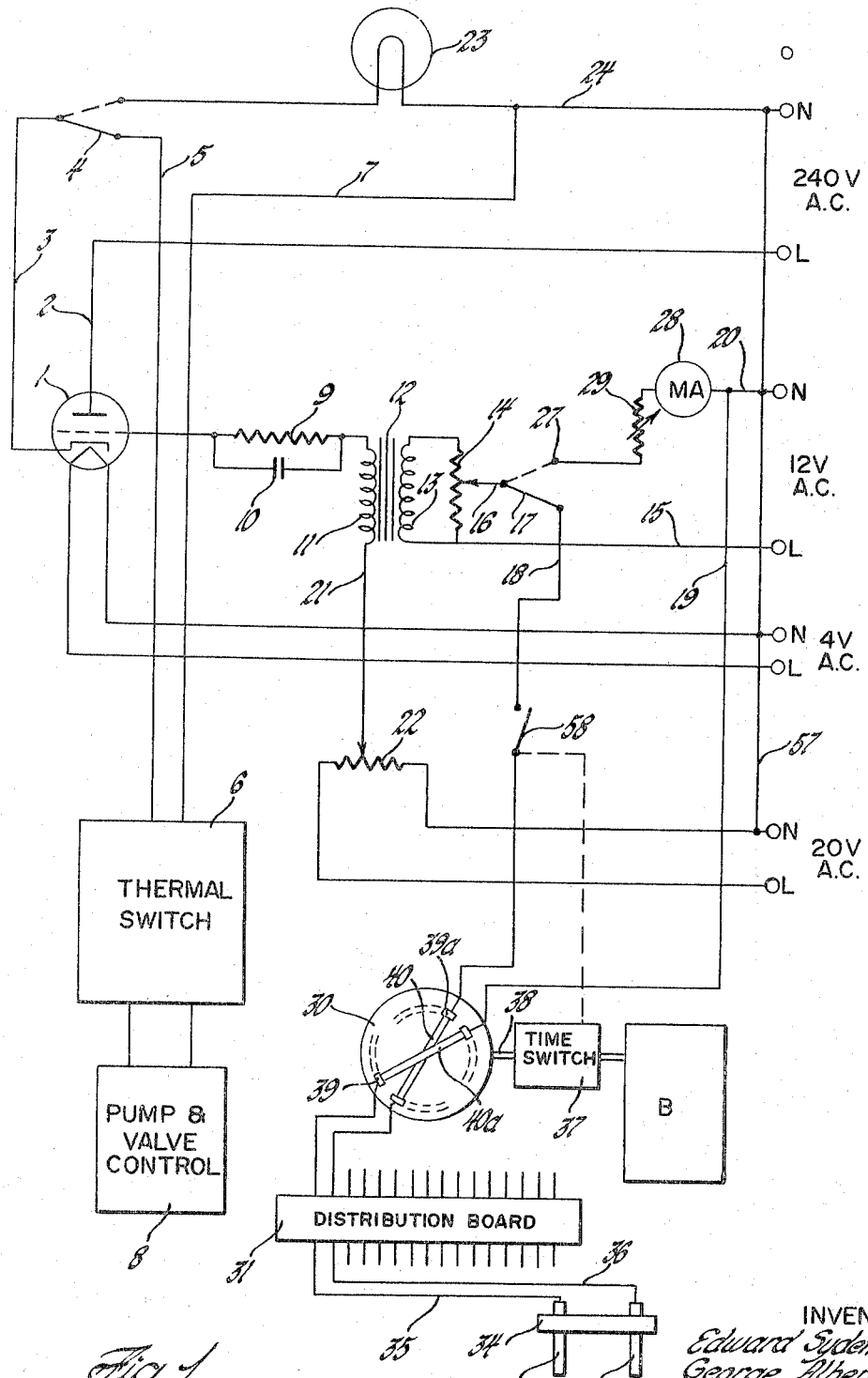

April 11, 1967 E. S. HILL ETAL 3,314,059
APPARATUS FOR DETECTING AND CONTROLLING THE PRESENCE OF SEWAGE
AND OTHER SLUDGES IN A LIQUID
Filed Sept. 24, 1962 2 Sheets-Sheet 1

INVENTORS
Edward Sydenham Hill,
George Albert Keep
& James Glen

By Emory L. Groff Jr.
ATTORNEY

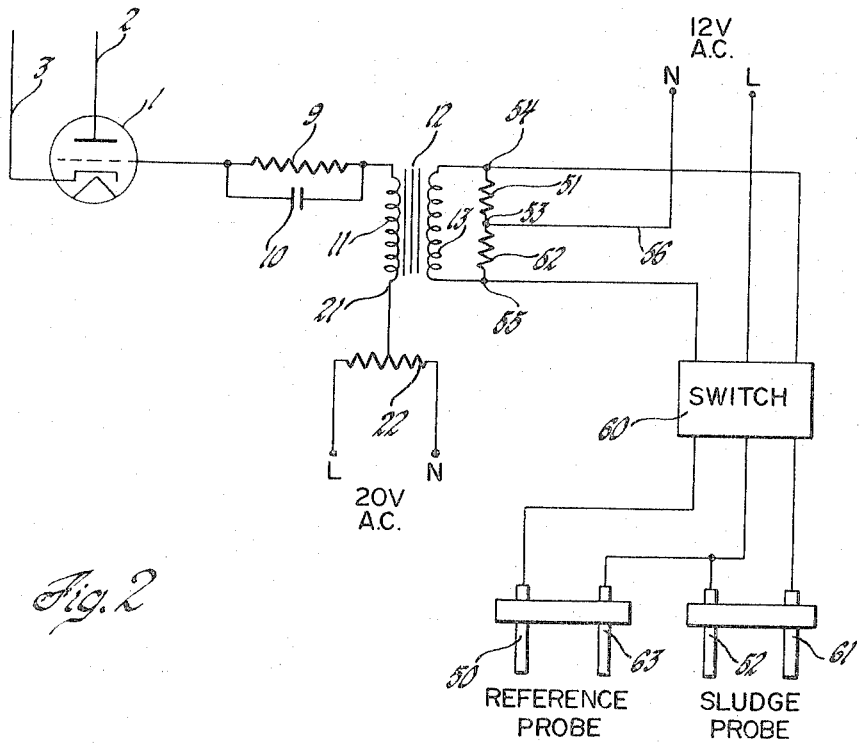

United States Patent Office 3,314,059
Patented Apr. 11, 1967

3,314,059
APPARATUS FOR DETECTING AND CONTROLLING THE PRESENCE OF SEWAGE AND OTHER SLUDGES IN A LIQUID
Edward Sydenham Hill, 39 Alexandra Road, Bedford Park, London, England; George Albert Keep, 122 Hinton Road, Hounslow, England; and James Glen, 1 Trevor Close, Isleworth, England
Filed Sept. 24, 1962, Ser. No. 225,528
2 Claims. (Cl. 340—244)

This invention relates to means for determining, i.e., detecting and testing and may also include controlling, the presence of sewage and other sludges in liquids, and such as may occur under water in tanks and hoppers.

The object of the invention is to enable a continuous investigation of the water or other liquid to be maintained in any given period and, in particular, to determine and utilize the density of the detected sludges for controlling means, such as pumps, valves and penstock motors, which can keep the sludge at the required density.

According to the invention there is provided apparatus for detecting or testing sludge in a liquid, which comprises an electronic switching device settable to respond at a selected datum level to signals arising from change of resistance in an electrical conductivity probe adapted for insertion in the liquid, and means operable by a signal from the switching device to give an indication of the presence of a signal at the probe.

The electrical conductivity probe employed in the invention may consist of a pair of rod-like electrodes, e.g., of carbon which are held spaced apart by an electrical insulation member to constitute a probe which can be inserted into the liquid, so that the electrical resistance path between the electrodes can be utilized to provide the control signals when the resistance changes.

The invention provides for relating the electrical signals to a pre-set datum corresponding to a particular sludge density and also provides that said signals cause an indication to be given or control to be effected when diversion from said datum density occurs. For example, the invention may provide datum setting within a range which may be indicated by current change from 30 to 150 milliamperes representative of a specific gravity range of between 1.002 to 1.026, and the signals may be initiated by any change from the pre-set datum, which may be as small as two milliamperes.

The invention may provide means for timed testing of any particular liquid tank or hopper, and for sequential testing of a plurality of probes in any one tank or in a plurality of tanks.

The switching device aforesaid may be triggered by the probe signal so that it has discrete on and off positions which are determined by variations above or below the set level of operation of the device, or the device may be adapted for progressive discharge when it is connected to a probe circuit but operates to energise the indicating means only when the density of the liquid exceeds the pre-set level.

The switching device may comprise an electrical relay such as a vacuum tube (or transistor) with an output circuit controlling a thermal or other switch, and an input fed from a probe circuit through a transformer of which the primary winding is associated with a diversionary circuit for effecting operation of the valve when a signal from the probe circuit exceeds a pre-set milliampere indication corresponding to a particular sludge density.

The detector equipment according to one embodiment of the invention comprises a plurality of pairs of probe electrodes, each for installation in the hoppers or tanks to be investigated; a controller comprising an electronic circuit adapted for "trigger" operation or for progressive grid amplitude operation; a selector with a distribution plug and jack or other distribution arrangement for testing hoppers or tanks and probes in desired sequence, and a timing device for limiting the time of investigation of a tank or hopper, hereinafter called, for convenience, a tank.

Any number of tanks may be dealt with merely by providing the appropriate positions on the selector.

The detector may be constituted by a plurality of similar sections to enable the sludge to be settled out in a corresponding number of stages, the density control in each stage or section being different. In general only two stages are necessary, and the time switch may be included in either section for allowing the number of tests to the tanks therein to be varied as desired.

The invention also comprises the feature of comparing sludge density of incoming and settled liquors, and giving an indication when a difference in density occurs to enable operations to be initiated which restore the required balance betwen the densities. For this purpose the invention employs a probe in each liquor, the one in the incoming liquor being the reference probe and the other, in the settled sludge, the sludge probe. These related pairs of probes may be connected in a balanced bridge circuit the arrangement of which is such that an operating signal is applied to the aforesaid switching device—which may be a thermionic tube or a transistor—when a predetermined difference of voltage or current is attained between sections of the circuit, each section of said circuit being connected to a partcular probe so that until this datum valve is reached, either by the resistance in the sludge probe decreasing or the resistance in the reference probe circuit increasing due, in either case, to a change of sludge density—the apparatus will not be effective to give an indication, which indication may include or be constituted by a control operation for altering sludge density of the liquor.

In order that the invention may be readily understood and carried into effect two embodiments will now be described, by way of example, with reference to the accompanying drawings, in which:

FIGURE 1 shows a circuit arrangement of one embodiment for determining sludge density in a liquor and FIGURE 2 is a circuit arrangement of another embodiment for determining and comparing sludges in different liquors so that working can be on a parameter determined by the relative density values of incoming and settled sludge, the circuit snown being a modification of FIGURE 1. Particularly as regards the circuit dividing or diversionary portion by which the electronic switching device is controlled.

Reference will first be made to FIGURE 1.

The circuit consists of a main electronic relay tube 1— in this instance a three-electrode vacuum discharge tube (General Electric G.T.L.C. tube)—having its plate connected over lead 2 to the line conductor of a 240 volts A.C. supply and its cathode connected over lead 3 to the moving contact of a change-over switch 4 having one fixed contact connected by a lead 5 with one side of a thermal switch 6, of any suitable available type, the switch 6 having its other side connected over lead 7 to the neutral conductor of the said 240 volts A.C. supply. The thermal switch, when operated, starts pumps, or opens valves, which are generally designated by the block 8.

In referring to the various A.C. supplies the term "neutral" conductor will be used to denote that conductor of the supply which is substantially at ground potential, the "line" conductor being the live conductor. The neutral conductors may be connected together if desired, in accordance with accepted practice, and as indicated by the line 57.

The grid of the relay tube 1 is connected through a one megohm resistor 9 (having for trigger operation a 800 micro-farad condenser 10 in parallel) to one end of the secondary winding 11 of an input transformer 12 of which the primary winding 13 is shunted by a diversionary circuit in the form of a 6 ohm potentiometer 14 having one side connected over lead 15 to the line conductor of a 12 volts A.C. supply, and the slider contact 16 connected to the moving contact of a change-over switch 17 having one fixed contact connected to a probe conructor 18, the return conductor 19 from the probe being connected to the neutral conductor of the said 12 volts A.C. supply by a lead 20.

The input transformer 12 has a step-up ratio, between primary winding 13 and secondary winding 11, of 5:1, and the impedance of the primary winding is considerably in excess of the resistance of the potentiometer, to ensure that the greater part of the power in the probe circuit is applied to the potentiometer and enables an initiating signal of small amplitude (e.g. as small as 2 milliamperes) to be effective to trigger or operate the relay tube.

The other end of the secondary winding of the input transformer 12 is connected over lead 21 to the slider of a 500 ohm potentiometer 22 having its resistance track connected across a 20 volts A.C. supply, the potentiometer enabling the grid bias setting of the relay tube 1 to be adjusted so that under no-signal conditions it just prevents anode-cathode discharge and the tube can be operated by an initiating signal of small amplitude (of the order of two milliamperes).

A test lamp 23 is connected by lead 24 to the neutral line of the said 240 volts A.C. supply, and over lead 25 to the other fixed contact of change-over switch 4, so that in the test position (shown dotted in FIGURE 1) of the switch 4 the lamp is in the cathode-anode circuit of the relay valve 1.

A datum setting device is connected to the other fixed contact 27 of the change-over switch 17 and consists of a milliammeter 28 in the lead 20 connected to the neutral line of the said 12 volts A.C. supply and a 500 ohms variable resistor 29 in series with the milliammeter 28.

The changeover switches 4 and 17 are both shown in the normal operating positions but for initially setting the apparatus to the desired datum they are both set to their other positions, indicated by dotted lines.

The probe conductor 18 leads through a selector switch 30 and a distribution board 31 to a probe consisting of a pair of electrodes in the form of carbon rods 32, 33 mounted about four to five inches apart, in parallel relation, and attached to an insulated bridge or head member 34, one electrode rod 32 being connected by way of lead 35 through the selector switch to the probe conductor 18, and the other electrode rod 33 being connected by way of lead 36 and the selector switch to the return probe conductor 19.

The selector 30 is actuated through a shaft 38 by a timing controller or time switch 37 which includes a switch 58 in the "live" lead to the probe. Any suitable type of selector 30 may be employed. Where two stages of sludge settlement are to be controlled a second detector apparatus, generally indicated by the block "B" in FIGURE 1 may be actuated by the same timing controller and selector and these may provide for having different testing times of the hoppers of different stages. For example, a rotary selector may be provided and may have two rings, respectively 39 and 39a, of switch segments which are bridged by rotary switch arms 40 and 40a, insulated from each other, the switch arms being moved from one set of contacts to the next at preselected times, the switch 58 being opened and closed for appropriate periods. Only two segments in the rings 39 and 39a have been shown, the others being indicated by dotted arcs. The selector may, for example, make one revolution in every four hours, connecting up the correct switch segments in turn. The testing period in any one hopper depends on the length of the segments, and both the time for rotation of the selector and the segment length can be arranged to suit requirements. As an alternative to the type of selector described, using switch segments, a commercially available type of timing controller may be employed, which makes use of a slowly rotating shaft driven by a time-controlled synchronous motor, the shaft having a number of cams mounted upon it which operate separate microswitches in timed sequence.

There are many probe assemblies (32, 33 and 34) fitted in selected positions inside the tank where sludge collection occurs, but only one probe is connected to the detector at any one time. The selector and distribution board determine by pre-setting which probe shall be in use at a required time.

The density of the solid content of the liquid, which constitutes the sludge, is determined by the resistance to alternating current between the operative pair of electrode rods 32, 33 of a probe. When this resistance falls to a sufficiently low level, indicating a high density of sludge, the initiating or control signal which is continuously transmitted over the probe conductors 18, 19 to the input transformer 12 increases in amplitude to reduce the bias on the grid of the relay tube 1 so as to cause it to conduct on the positive half cycles of its anode supply and provide a discharge of about one ampere at almost 240 volts A.C. which is suitable for operating the thermal switch 6. This switch is arranged to have a delay of about twenty seconds, so that if the discharge is maintained for this period, the switch operates to start the pumps or other control operations of the equipment indicated by 8.

As will be appreciated from the foregoing, the relay tube 1 is required to produce a discharge when the density of the sludge reaches or exceeds a predetermined value or datum, and it is controlled by the variation in probe current resulting from the change in density.

By means of the datum setting device and the diversionary circuit 14 it is possible to set the relay tube 1 to operate for a change of two milliamperes over a range of datum settings between 30 and 150 milliamperes, which may represent a range of specific gravities from 1.002 to 1.026. These figures of parameter and performance may vary according to circuit conditions and with the pattern of sludge characteristics in any particular liquor, but the diversionary circuit ensures that the relay tube can be caused to discharge at any chosen current change above the set datum.

For the purpose of setting the density datum, the change-over switch 17 and the change-over switch 4, are set to the positions shown dotted in FIGURE 1. The tube discharge, when initiated, now takes place through the test lamp 23, and the variable resistor 29 of the datum setting device is adjusted until the milliammeter 28 gives a reading corresponding to the density required, as determined by the flow of current in the 12 volts circuit having the diversionary potentiometer 14 in series with the datum setting resistor 29. As has been indicated, the relay tube 1 is biassed to cut-off by the voltage in the secondary circuit of the input transformer 12, which is set by adjustment of the potentiometer 22. That is to say, having set the datum or electrode current by the potentiometer 29, the parameter setting of the tube grid circuit can be effected by adjustment of the diversionary potentiometer 14 until the tube just discharges and lights the test lamp 23.

After setting the density datum, the setting device and the test lamp 23 are isolated by restoring the change-over switches 4 and 17 to the detection position shown wherein the relay tube is in circuit with the thermal switch 6, and the probe circuit 18, 19 is connected to the input transformer 12.

By connection of a probe 32, 33, 34 across the probe circuit 18, 19 of the detector, the latter is rendered operative to give an indication when the signal from the probe attains or exceeds the value set up in the diversionary circuit which is the sludge density setting of the detector. This signal which, in the example, is two milli-amperes, reduces the grid bias on the relay tube and thus causes it to conduct and energise the thermal switch 6. When the density in the sludge being investigated drops below the datum level, due to the operation of the control means 8 consequent upon operation of the thermal switch, the cut-off bias is re-established on the relay tube 1, which thereupon disconnects the thermal switch and stops the operation of the control 8.

It is a feature of the circuit shown that the operation of the relay tube 1 can be controlled in two ways. By the addition of the condenser 10 it becomes a trigger device with the grid potential phase-displaced with respect to the anode potential. By removing the condenser 10 the phase of the grid voltage with respect to the anode voltage is changed and the discharge through the relay tube 1 is variable with the probe condition. With the condenser 10 in circuit a small variation in voltage above the datum level causes a sharp change in the bias condition which gives a quick change from the nonconducting to the conducting condition of the tube, after the manner of mechanical switching. The trigger method ensures among other advantages, long life for the relay valve. When the second method is used, the condenser 10 is removed and the phase of the grid voltage is changed so that by varying the grid potential the valve conduction can be varied from zero to a maximum. Phase changes are caused by the type of components and circuit used. Phase angles are not necessarily but can always be calculated by the use of standard formulae, and may be adjusted by changing the values of components used. Using the second method, relay tube 1 may discharge for the whole period that a probe is connected to the detector, but if the density of the sludge is lower than the datum setting, the discharge from the tube will not be sufficient to operate the thermal switch 6. However, as soon as the sludge density reaches or exceeds the datum setting, then the tube 1 discharge reaches maximum and the thermal relay 6 is operated after the aforementioned delay has expired.

It is usual for a tank to be divided into hoppers and if this is the case, a probe is provided and installed in every hopper and the arrangement is such that the conditions in the hoppers are tested in turn by the time controlled selector 30 and in any required sequence by the connections of the distribution board 31, which may include jack and plug elements for easy change of connections.

In sludge settlement operations it is sometimes desirable to settle in two stages, which means that the density datum for each stage is different and the testing time is also different for the respective stages. The detector according to the invention can have any number of suitable sections individual to respective stages, each being generally similar to that shown in FIGURE 1 it merely being necessary to provide suitable additional positions on the change-over switches 4 and 17 and on the selector 30. It will be noted that the test lamp 23 and the datum setting device may be common to all the stages employed.

In FIGURE 1 a second stage denoted by the block B is shown and may represent a secondary stage of settlement, and while both stages are generally similar, the time switch 37 may be connected either in the probe conductor 18 or in the corresponding probe conductor of stage section B so as to allow the number of tests of the respective tanks to be varied as required, say a series of four tests in every eight hours.

Whether more than one section is used depends entirely on whether the instrument setting is the same for all hoppers or whether certain hoppers require different settings. Generally one setting for all hoppers is sufficient as most sewage works now carry out sedimentation in one stage only.

If more than one section is used they would not operate simultaneously. All sections might be energised at the same time but which section was actually operating would depend on which hopper was being tested. Each hopper has its own probe which is connected to the detector by a plug-in system in the distribution board 31 and which is operative when selected by the selector switch 30. By means of the distributor the sequence of the tests can be varied if required.

The object of the time switch 37 is to determine the frequency of the cycles of operations, i.e. if, say, 16 hoppers are involved then the time switch would make circuit for the time required to test 16 hoppers and would then open circuit until such time as it is again required to test the hoppers, when it would again make circuit and thus commence the second cycle of tests.

In the arrangement described herein the switching relay valve 1 operates to give an indication when a given sludge density is detected, by a reduction in the electrical resistance at the probe, which has the effect of reducing the grid bias at the valve, the bias being increased again when the density level of the sludge is reduced as the result of the control operations effected by the thermal switch 6.

It will be understood that the invention in its broadest aspects is not limited to such an arrangement and that the initiating or control signal received from the probe may operate a switching tube or other circuit in a different manner.

With reference now to FIGURE 2, it will be noted that similar parts as for FIGURE 1 are identified by the same reference numerals and have the same significance. Instead of the diversionary or current dividing circuit 14 and the datum setting device, there is a fixed datum head comprising two six ohm resistors 51, 52 with their midpoint 53 connected to one conductor 56 of the 12 volt supply and the end 54 connected to one electrode 61 of a sludge probe having its other electrode probe 62 connected to one electrode 50 of a reference probe whose other electrode 63 is connected to the end 55.

The sludge probe in this instance is located in the sludge and the reference probe is located in the incoming liquor, both probes being connected to the 12 volts A.C. supply.

There may be several sludge probes each with an associated reference probe, or a reference probe may be common to several sludge probes, selection of the associated twin probe sets being by way of a selector switch similar to the switch 30 in the case of FIGURE 1 and indicated herein by the block 60.

The primary winding 13 of the transformer 12 is connected across the resistors 51, 52, and thus the operation of the control circuit is similar to that of a Wheatstone bridge.

The secondary winding 11 of the transformer 12 has one end connected through a one megohm resistor 9 to the grid of the relay tube 1 having its cathode connected over lead 3 to the indicating and/or sluice gate operating equipment to be controlled; the other end of the secondary winding is connected by way of the lead 21 through the potentiometer 22 to the grid bias supply— twenty volts as in FIGURE 1—by which, under no-signal conditions, the tube is cut-off, but can be readily operated by a change in the relative balance in the primary circuit of the transformer 12. In this relative balance condition between reference and sludge probe circuits, the differential current (which may be zero or a selected value) in the primary winding 13 operates against the grid bias in the secondary so as to determine the cut-off of the tube 1. When the resistance between the electrodes 61, 62 in the sludge circuit becomes less than that between the electrodes 62, 50 in the reference circuit— thereby indicating that the sludge density in the sludge tank is increasing in relation to that in the incoming liquor—the balance of the control bridge at the transformer 12 is disturbed so as to effect such reduction in the grid bias circuit of the tube 1 as to cause the latter to conduct and, through the control gear, to apply the appropriate control operation. When the relative current balance of the control bridge is restored by the consequent adjustment of the two sludge densities, the grid bias is returned to the tube where the valve 1 is again cut-off. A similar result occurs when the resistance in the reference probe circuit increases due to the density of the sludge in the incoming liquor decreasing, and thus a two-way control is effected by virtue of the datum level of detector operation being determined by the differential current between the two probe circuits. By varying the grid control voltage in the bias circuit of the tube 1, by means of the potentiometer 22, the point at which control is obtained can be pre-set between a differential of zero to an upper limit which, in the embodiment being described may be 20 milli-amperes. Thus, for example, if the operating datum differential is 10 milli-amperes, then until this differential is attained either by the resistance in the sludge probe circuit decreasing or the resistance in the reference probe circuit increasing, the detector will not operate.

We claim:
1. Apparatus for determining the sludge density of a liquid comprising an electric conductivity probe having two spaced electrodes for insertion in the liquid, a transformer having a primary and a secondary winding, a first source of alternating current to energize said probe, voltage selecting means for setting a desired sludge datum level connected to said primary winding probe and first source, whereby the alternating current flowing through said probe varies with the resistance of said liquid between said electrodes in dependence upon the sludge density thereof and a selected proportion of the voltage drop in said voltage selecting means due to said current is applied to said primary winding, a second source of alternating current, second voltage selecting means connected to said second source and said secondary winding, a three-electrode electron tube having a control electrode and two other electrodes for connection in a power circuit, said control electrode being connected to said secondary winding so that an alternating voltage bias selected by the setting of said second voltage selecting means is applied to said control electrode to maintain said tube in a non-conductive state, and means to carry out a desired function for connection in said power circuit, whereby an increase in the sludge density beyond the datum level set by said first voltage selecting means causes a voltage to be induced in said secondary winding whose magnitude is sufficient to overcome said bias voltage and cause said tube to become conductive and said means to carry out a desired function to become operative.

2. Apparatus for comparing the sludge density of two liquids comprising a reference electric conductivity probe having two electrodes for insertion in one liquid, a sludge electric conductivity probe having two electrodes for insertion in the other liquid, a transformer having a primary and a secondary winding, a tapped impedance connected across said primary winding, a first source of alternating current having one pole connected to one electrode of each probe and the other pole connected to the tapping on said impedance, the other electrodes of the two probes being connected respectively to the ends of said primary winding, whereby the alternating current flowing through each probe varies with the resistance of the respective liquid between its electrodes in dependence upon the sludge density thereof, and the voltage drop in the part of said impedance on one side of the tapping depends upon the current flowing in said reference probe and the voltage drop in the other part of said impedance depends upon the current flowing in said sludge probe, the two voltages acting in opposition and the difference voltage being applied to said primary winding, a second source of alternating current, voltage selecting means connected to said second source and said secondary winding, a three-electrode electron tube having a control electrode and two other electrodes for connection in a power circuit, said control electrode being connected to said secondary winding so that an alternating voltage bias selected by the setting of said voltage selecting means is applied to said control electrode to maintain said tube in a nonconductive state, and means to carry out a desired function for connection in said power circuit, whereby an increase in the sludge density of said other liquid beyond that of said one liquid to an extent dependent upon the setting of said voltage selecting means causes a voltage to be induced in said secondary winding whose magnitude is sufficient to overcome said bias voltage and cause said tube to become conductive and said means to carry out a desired function to become operative.

References Cited by the Examiner
UNITED STATES PATENTS

| | | | |
|---|---|---|---|
| 1,694,609 | 12/1928 | Willits | 340—249 |
| 2,082,213 | 6/1937 | O'Donnell | 324—30 |
| 2,411,888 | 12/1946 | Long et al. | 340—220 X |
| 2,422,873 | 6/1947 | Wolfner | 324—30 |
| 2,452,615 | 11/1948 | Thomson | 340—244 X |
| 2,695,976 | 11/1954 | Hasenkamp | 324—30 |
| 2,950,601 | 8/1960 | Wightman | 340—236 X |
| 3,235,469 | 2/1966 | Parke | 324—30 X |

NEIL C. READ, *Primary Examiner.*

THOMAS B. HABECKER, *Examiner.*

D. K. MYER, *Assistant Examiner.*